United States Patent [19]

Bindin

[11] 4,167,351
[45] Sep. 11, 1979

[54] METAL-TO-CERAMIC SEALS

[75] Inventor: Peter J. Bindin, Runcorn, England

[73] Assignee: Chloride Silent Power Limited, London, England

[21] Appl. No.: 798,277

[22] Filed: May 19, 1977

[30] Foreign Application Priority Data

May 20, 1976 [GB] United Kingdom ............... 20959/76

[51] Int. Cl.² .......................... F16B 7/02; F16C 9/00; F16D 1/00; F16G 11/00
[52] U.S. Cl. .................................... 403/30; 403/179; 403/284; 403/404; 285/173; 285/329; 285/332.2; 29/447
[58] Field of Search .................. 29/447, 516, 458; 285/332, 381, 382.1, 382.2, 332.2, 332.3, DIG. 12, 238, 239, 329, 173, DIG. 6, 187, 334.5, 332.4; 403/273, 28, 29, 30, 179, 284, 404; 228/127, 122, 124; 174/50.61, 152 GM; 65/59 R, 59 B

[56] References Cited

U.S. PATENT DOCUMENTS

| | | | |
|---|---|---|---|
| 1,046,085 | 12/1912 | Kraus | 285/332.3 X |
| 1,066,290 | 7/1913 | Kraus | 403/29 |
| 1,716,140 | 6/1929 | Kirwer | 285/DIG. 12 |
| 1,871,371 | 8/1932 | Jackson | 285/238 X |
| 2,169,194 | 8/1939 | Geyer et al. | 29/458 |
| 2,482,178 | 9/1949 | Harris et al. | 228/122 X |
| 3,024,300 | 3/1962 | Martin | 285/DIG. 12 |
| 3,036,674 | 5/1962 | Branin | 228/122 X |
| 3,746,374 | 7/1973 | Sedgwick et al. | 285/238 |

OTHER PUBLICATIONS

Article in Metals Handbook (1948 Ed.) Published by American Society for Metals, pp. 601–605.

Primary Examiner—Wayne L. Shedd
Attorney, Agent, or Firm—Beveridge, DeGrandi, Kline and Lunsford

[57] ABSTRACT

For sealing metal annular elements on to a cylindrical ceramic member, e.g. a ceramic electrolyte tube in a sodium-sulphur cell without causing excessive hoop stress in the ceramic, the ceramic tube is formed with tapered inner and outer surfaces at one end, correspondingly tapered inner and outer annular elements are put over these surfaces with a soft metal, e.g. aluminium interface layer, the inner and outer annular elements having coefficients of thermal expansion respectively less than and greater than that of the ceramic, the assembly is then heated and the annular elements forced in the axial direction onto the ceramic whereby the ceramic material, on cooling, is tightly secured between the annular members.

21 Claims, 2 Drawing Figures

METAL-TO-CERAMIC SEALS

BACKGROUND OF THE INVENTION

This invention relates to metal-to-ceramic seals and is concerned more particularly with the sealing of an annular metal member onto a cylindrical ceramic element.

Such seals may be used for example in electrochemical cells of the kind having a solid ceramic electrolyte. Sodium sulphur cells are typical examples of such cells; these have to operate at elevated temperatures where the electrode materials are liquid. The seals necessary to seal these electrode materials within the cell have therefore not only to withstand highly reactive materials at these temperatures but are also subjected to temperature cycling. As a typical example, a sodium-sulphur cell might have a beta alumina tube closed at one end forming the electrolyte with the sodium on the face of the tube, preferably the outer face and the sulphur/sodium polysulphides on the other face. The cell has to be sealed to prevent escape or mixing of these materials and a number of proposals have been made for various types of sealing arrangements for such cells. Compared with most metals, ceramic materials are generally weak, particularly in tensile strength and it is necessary in any seal for such a cell to ensure that the ceramic material is not overstressed.

In a sodium-sulphur cell, the beta-alumina electrolyte tube may have an alpha-alumina tubular extension at its open end so that the end portion is not ionically conductive. The alpha-alumina and beta-alumina have similar coefficients of thermal expansion and it is well known that the alpha-alumina extension tube can be secured to the beta-alumina with a glass seal. In this case, the closure of the cell has to be effected by sealing to the alpha-alumina tube but it is the same problem of forming a metal-to-ceramic seal on the end of a ceramic tube.

BRIEF SUMMARY OF THE INVENTION

It is an object of the present invention to provide an improved form of metal-to-ceramic seal which enables metal elements to be sealed onto the open end of a ceramic tube whilst avoiding excessive hoop stress in the ceramic material.

According to one aspect of the present invention, a method of securing annular metal elements to a cylindrical ceramic member comprises the steps of putting elements or coatings of relatively soft metal over inner and outer shaped surfaces of the ceramic member at or near an end thereof, putting inner and outer annular metal elements having shaped surfaces over the respective soft-metal covered inner and outer surfaces of the ceramic, the shaping of said shaped surfaces of the metal elements being such that the internal diameter of the outside element decreases in the direction towards the end of the cylindrical member and the external diameter of the inner element increases in this direction over the same portion of the member, the inner and outer annular members being of a metal which is hard compared with the aforementioned soft metal and having coefficients of thermal expansion such that the coefficient of expansion of the outer annular member is greater than that of the ceramic material and that of the inner annular member is less than that of the ceramic material, heating the assembly and, when the assembly is hot, forcing the annular members axially into tight engagement with the ceramic material whereby the ceramic material is tightly secured on cooling between the two annular members. It will be seen that, with this construction, by suitable choice of the coefficients of thermal expansion of the materials, there need not be any hoop stress in the ceramic material. In practice however some hoop stress is to be expected although this depends only on the difference of the inward pressure on the ceramic exerted by the outer annular member and the outward pressure on the ceramic exerted by the inner annular member. It is necessary to pay attention to the overall stress distribution during the sealing process and during subsequent thermal cycling. The thickness, yield points and moduli of elasticity of the annular metal members must be taken into account in the detailed design. It may be convenient to design these members to that they are stressed beyond the yield point before any excessive stresses can be produced in the ceramic. It will be seen that substantial sealing pressures can be obtained without excessive hoop stress in the ceramic material. The soft metal interlayer between the ceramic and the annular members deforms to fill up any surface irregularities and so ensures a tight seal.

The shaped surfaces of the inner and outer annular members may be conical surfaces. The aforesaid inner and outer surfaces of the ceramic member may be shaped so that the outside diameter of the member decreases in the direction towards the end of the member and the inside diameter increases in this direction over the same portion of the member. The aforesaid surfaces of the ceramic material and the inner and outer annular elements may be correspondingly tapered.

The invention includes within its scope a method of securing annular metal elements to a cylindrical ceramic member comprising the steps of forming the ceramic member to have tapered inside and outside surfaces at or near an end of the cylindrical member, the tapers being straight tapers arranged so that the outside diameter decreases in the direction towards the end of the cylindrical member and the inside diameter increases in this direction over the same portion of the member, putting conical elements or coatings of relatively soft metal over the tapered surfaces, putting inner and outer annular metal elements having correspondingly tapered surfaces over the respective soft-metal covered inner and outer surfaces of the ceramic, the inner and outer annular members being of a metal which is hard compared with the aforementioned soft metal and having coefficients of thermal expansion such that the coefficient of expansion of the outer annular member is greater than that of the ceramic material and that of the inner annular member is less than that of the ceramic material, heating the assembly and, when the assembly is hot, forcing the annular members axially into tight engagement with the ceramic material whereby the ceramic material is tightly secured on cooling between the two annular members.

Preferably at least one annular groove is formed on each of the tapered surfaces of the ceramic material. The soft metal can deform into such a groove. The groove thus helps to avoid the development of interfacial pressure except where it is needed; in the region of the groove, the soft metal deforming into the groove relieves the interfacial pressure, which may be substantially zero in this region. Such a groove or grooves therefore enables a non-linear pressure distribution to be developed across the tapered surface.

In some cases, the groove may be formed at the end of the ceramic material; in other words the surface of the material has a step with the shoulder facing towards the end of the ceramic tube.

With a suitable choice of soft interlayer material, diffusion bonding may take place between the soft metal and one or more of the other materials to improve still further the seal.

The choice of materials to be used will, in general depend on the use to be made of the article. In an electrochemical cell having a liquid alkali metal and a liquid cathodic reactant such as for example sulphur/polysulphides, the various materials will have to be chemically inert with respect to the cell materials at the operating temperature of the cell.

The soft metal need not necessarily be the same metal on both faces of the ceramic. It is convenient however to use the same material and, in the heating operation, to heat the assembly to a temperature at which this material softens.

If the shaped surfaces on the ceramic are tapered surfaces, the inside and outside tapers may be at the same angle of slope or at different angles.

The ceramic material, in an electrochemical cell, need not necessarily be a solid electrolyte. As an example, for a sodium-sulphur cell having beta alumina electrolyte, metal annular members may be attached as described above but often it is convenient to secure an annular alpha alumina element onto the end of the beta alumina tube, for example by using a glass seal, and to have the metal annular elements secured onto this alpha-alumina annular member. In such an arrangement, it is possible to secure the metal elements onto the alpha-alumina before or after the latter is secured onto the beta-alumina. In referring to the ceramic material, it will be understood therefore that this might be the electrolyte material suitably modified to eliminate ionic conductivity or it might be a ceramic element which is secured or which will subsequently be secured to the electrolyte material.

In a sodium-sulpur cell, if the sodium is outside the electrolyte tube and the sulphur/polysulphide cathodic reactant is on the inside of the electrolyte tube, it is convenient to make the outer annular metal member of stainless or mild steel and the inner metal annular member of a nickel iron alloy such as Nilo K and to use aluminium as the soft metal. Copper however might be employed on the sodium side.

According to another aspect of the invention there is provided an assembly comprising a cylindrical ceramic member having shaped inner and outer surfaces at or near one end of the member, these surfaces being such that the outer diameter decreases towards the end of the member and the inner diameter increases towards that end of the member, and inner and outer annular elements of a hard metal having tapered surfaces complementary to those on the ceramic and shrunk onto the ceramic with interlayers of a soft metal between the ceramic and each of said inner and outer annular elements, the coefficient of thermal expansion of the outer annular element being greater than that of the ceramic and of the inner annular element being less than that of the ceramic. As mentioned above, the shaped surfaces of the ceramic member may have straight tapers.

In particular the invention includes within its scope an assembly as described and for use in a sodium-sulphur cell wherein the ceramic member is a tube or cylinder of beta-alumina or alpha-alumina and wherein the inner annular metal member is a nickel-iron corrosion-resistant alloy and the outer metal annular member is mild steel and wherein the soft metal is aluminium.

DESCRIPTION OF THE PREFERRED EMBODIMENTS

Figure 1:
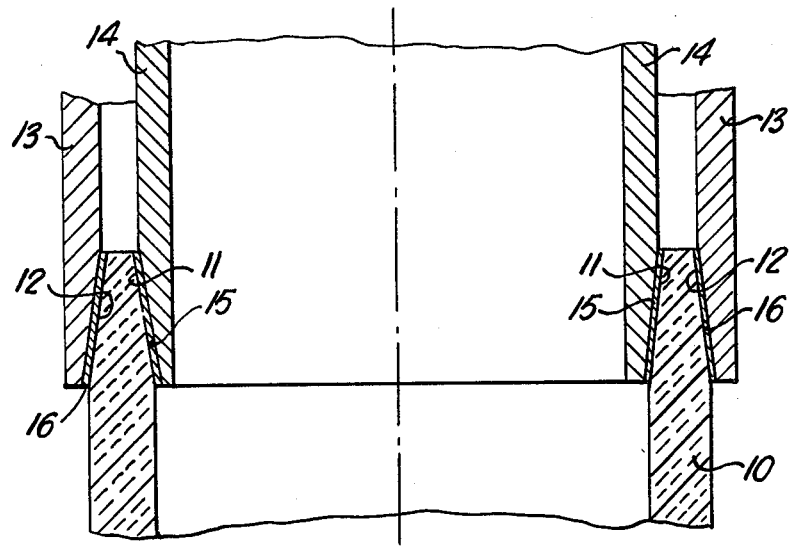
FIG. 1 is a diagrammatic axial section through part of a ceramic cylinder with metal rings secured thereto for use in a sodium-sulphur cell illustrating one example of the invention.

Referring to FIG. 1, there is shown part of a cylindrical ceramic element 10 which, in this particular embodiment is an alpha-alumina ring suitable for securing onto the open end of a beta-alumina ceramic tube (not shown) constituting a solid electrolyte in a sodium-sulphur cell. At one end of the element 10, its inner and outer faces are tapered as shown at 11 and 12 respectively with straight tapers such that the outer diameter decreases and the inner diameter increases towards the end of the member 10. In this particular example, the two tapers have the same slope but this is not essential. Secured on these tapered faces are an outer ring 13 of mild steel and an inner ring 14 of Nilo K. These rings have tapered surfaces complementary to the tapers on the ceramic material. A thin layer of aluminium is provided between each of the tapered surfaces. In this particular embodiment the aluminium is made in the form of two cones 15, 16, one of which is put inside the inner taper and the other is put over the outer taper. In a typical case, this aluminium, after final assembly of the ring, might be 0.2 mm thick but, for clarity in the drawings, its thickness is exaggerated.

To make the assembly, the inner and outer metal rings 14, 13 are pushed onto the ceramic material 10 and the assembly is put in an inert atmosphere, such as argon, or is put in a vacuum (typically 0.1 N/m$^2$) and the assembly is heated to a temperature of 500° to 650° C. for a time that can vary from 0.1 to 10 minutes. The inert gas or vacuum is used to prevent any oxidation of the metal during heating. After so heating, an axial load is applied onto the metal elements with respect to the ceramic material to force the metal elements tightly onto the ceramic. In this particular example, the axial load was such as to produce a pressure of 2 N/mm$^2$ across the conical sealing faces. When cool, the materials shrink and this assembly produces a tight bond between the components. The coefficient of linear expansion of the ceramic material, over the temperature operating range of a sodium-sulphur cell, typically from room temperature up to 350° or 400° C., is intermediate between the coefficients of linear expansion of the mild steel and the Nilo K, the former being greater than that of the ceramic and the latter less. The shrinking of the metal members onto the ceramic thus applies radial compressive forces onto the ceramic material but the hoop stress therein depends only on the difference between these radial compressive forces and is therefore necessarily less than would be the case if a single ring were shrunk onto the outside or the inside of the ceramic.

Figure 2:
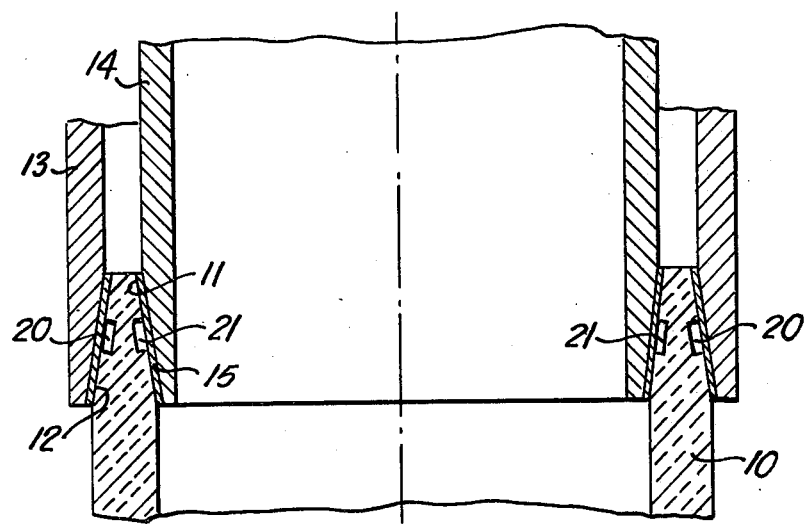
FIG. 2 is a diagram illustrating a modification of part of the construction of FIG. 1.

In some cases it may be desirable to increase still further the radial compressive forces. Local increase in the compressive forces can be obtained by shaping the ceramic material, for example by forming circumferential grooves 20, 21 as shown in FIG. 2. It will be seen that the radial compressive load is distributed over a smaller area hence resulting in greater pressure in the localised regions but that the hoop stress will remain unchanged if the same materials and overall dimensions are used. The soft metal flows into the groove and, because of this, the interfacial pressure will be very substantially relieved in the region immediately adjacent the groove where the soft metal can readily flow away into the groove. The pressure area is thus in the regions away from the groove. Such a groove therefore permits of selective choice of regions of higher pressure.

In the above-described arrangements, a separate aluminium element has been put between the ceramic tapered surface and the annular metal element 13 or 14 to form the soft deformable metal. In some cases, it may be preferred to put aluminium coatings on the ceramic tapered surface and/or on the co-operating tapered surface of the metal element. Preferably the coating is put on both surfaces. Ion-plating may be used for forming these coatings.

The annular metal element 13 and 14 would typically be formed of steel. In designing these elements, their thickness, and the yield points and moduli of elasticity should be taken into account to ensure that they will deform before the ceramic material is over-stressed.

I claim:

1. A method of securing annular metal elements to a cylindrical ceramic member comprising the steps of forming said cylindrical ceramic member at one end thereof with inner and outer shaped surfaces, said inner and outer shaped surfaces of said ceramic member each having at least one annular groove, putting elements or coatings of relatively soft metal over said inner and outer shaped surfaces, putting inner and outer annular metal elements having shaped surfaces over the respective soft-metal covered inner and outer shaped surfaces of the ceramic, the shaping of said shaped surfaces of the metal elements being such that the internal diameter of the outer element decreases in the direction towards the end of the cylindrical member and the external diameter of the inner element increases in this direction over the same portion of the member, the inner and outer annular members being of a metal which is hard compared with the aforementioned soft metal and having coefficients of thermal expansion such that the coefficient of expansion of the outer annular member is greater than that of the ceramic material and that of the inner annular member is less than that of the ceramic material, heating the assembly and, when the assembly is hot, forcing the annular members axially into tight engagement with the ceramic material whereby the ceramic material is tightly secured on cooling between the two annular members.

2. A method as claimed in claim 1 wherein the shaped surfaces of the inner and outer annular members are conical surfaces.

3. A method as claimed in claim 1 wherein said inner and outer surfaces of the ceramic member are shaped so that the outside diameter of the member decreases in the direction towards the end of the member and the inside diameter increases in this direction over the same portion of the member.

4. A method as claimed in claim 2 wherein said shaped surfaces of the ceramic material and the inner and outer annular elements are correspondingly tapered.

5. A method of securing annular metal elements to a cylindrical ceramic member comprising the steps of forming the ceramic member to have tapered inside and outside surfaces at or near an end of the cylindrical member, said inside and outside surfaces of the ceramic members each having at least one annular groove, the tapers being straight tapers arranged so that the outside diameter decreases in the direction towards the end of the cylindrical member and the inside diameter increases in this direction over the same portion of the member, putting conical elements or coatings of relatively soft metal over the tapered surfaces, putting inner and outer annular metal elements having correspondingly tapered surfaces over the respective soft-metal covered inner and outer surfaces of the ceramic, the inner and outer annular members being of a metal which is hard compared with the aforementioned soft metal and having coefficients of thermal expansion such that the coefficient of expansion of the outer annular member is greater than that of the ceramic material and that of the inner annular member is less than that of the ceramic material, heating the assembly and, when the assembly is hot, forcing the annular members axially into tight engagement with the ceramic material whereby the ceramic material is tightly secured on cooling between the two annular members.

6. A method as claimed in claim 1 wherein the soft metal coatings are put on both the inner and the outer shaped surfaces and the corresponding surfaces of the metal elements.

7. A method as claimed in claim 1 wherein different soft metals are employed on the inner and the outer shaped surfaces of the ceramic.

8. A method as claimed in claim 1 wherein the same soft metal is employed on the inner and the outer shaped surfaces of the ceramic.

9. A method as claimed in claim 1 wherein the assembly is heated to a temperature at which the soft metal softens.

10. A method as claimed in claim 5 wherein the inner and outer shaped surfaces of the ceramic have straight tapers and wherein the inside and outside tapers on the ceramic are at the same angle of slope.

11. A method as claimed in claim 1 wherein the inner and outer shaped surfaces of the ceramic are tapered, the inside and outside tapers on the ceramic being at different angles.

12. A method as claimed in claim 1 and for forming a closure to a sodium sulphur cell having a beta-alumina ceramic tube and wherein the inner metal annular member is a nickel iron alloy.

13. A method as claimed in claim 1 wherein aluminium is used as the soft metal.

14. An assembly comprising a cylindrical ceramic member having shaped inner and outer surfaces at or near one end of the member, these surfaces being such that the outer diameter decreases towards the end of the member and the inner diameter increases towards that end of the member, and inner and outer annular elements of a hard metal having tapered surfaces complementary to those on the ceramic and shrunk onto the ceramic with interlayers of a soft metal between the ceramic and each of said inner and outer annular elements, the coefficient of thermal expansion of the outer annular element being greater than that of the ceramic and of the inner annular element being less than that of the ceramic.

15. An assembly as claimed in claim 14 wherein said shaped surfaces of the ceramic member have straight tapers.

16. An assembly as claimed in claim 14 and forming part of a sodium-sulphur cell wherein the ceramic member is a tube or cylinder of beta-alumina or alpha-alumina and wherein the inner annular metal element is a nickel-iron corrosion-resistant alloy which has a lower coefficient of thermal expansion than mild steel, the outer metal annular element is mild steel and wherein the soft metal is aluminum.

17. A method of securing an annular metal element to a cylindrical ceramic member comprising the steps of forming said cylindrical ceramic member at one end thereof with a shaped surface, said shaped surface of said ceramic member having at least one annular groove, putting a layer of relatively soft metal over said shaped surface, forcing an annular metal element having shaped surfaces against the soft-metal to force the soft metal into the groove in said shaped surface of the ceramic member and into tight engagement with the ceramic material whereby the ceramic material is tightly secured by the soft metal to the annular metal element, the metal element being of a metal which is hard compared with the aforementioned soft metal.

18. The method of claim 17 wherein the shaped surface of the metal element is tapered.

19. A method of securing an annular metal element to a cylindrical ceramic member comprising the steps of forming said cylindrical ceramic member at one end thereof with a shaped ceramic surface which has surface irregularities, placing a layer of relatively soft metal on said shaped ceramic surface, and forcing the annular metal element against the relatively soft metal to force the relatively soft metal against the ceramic surface to fill up surface irregularities and provide a tight seal between the shaped ceramic surface and the annular metal element.

20. An assembly comprising a cylindrical ceramic member having a shaped ceramic surface at or near one end of the member, said shaped ceramic surface having at least one annular groove therein, and an annular hard metal element having a surface complementary to the shaped ceramic surface, a compressed interlayer of soft metal between the shaped ceramic surface and the annular hard metal element.

21. The assembly of claim 20 wherein said soft metal fills up surface irregularities of the shaped ceramic surface to provide a tight seal between the shaped ceramic surface and the annular metal element.

* * * * *